Aug. 4, 1964  A. G. H. ANDERSEN  3,142,980
FAST ACTING TENSILE TESTER

Filed July 2, 1962  7 Sheets-Sheet 1

INVENTOR.
Axel G. H. Andersen
BY
S. J. Rotondi & A. T. Dupont

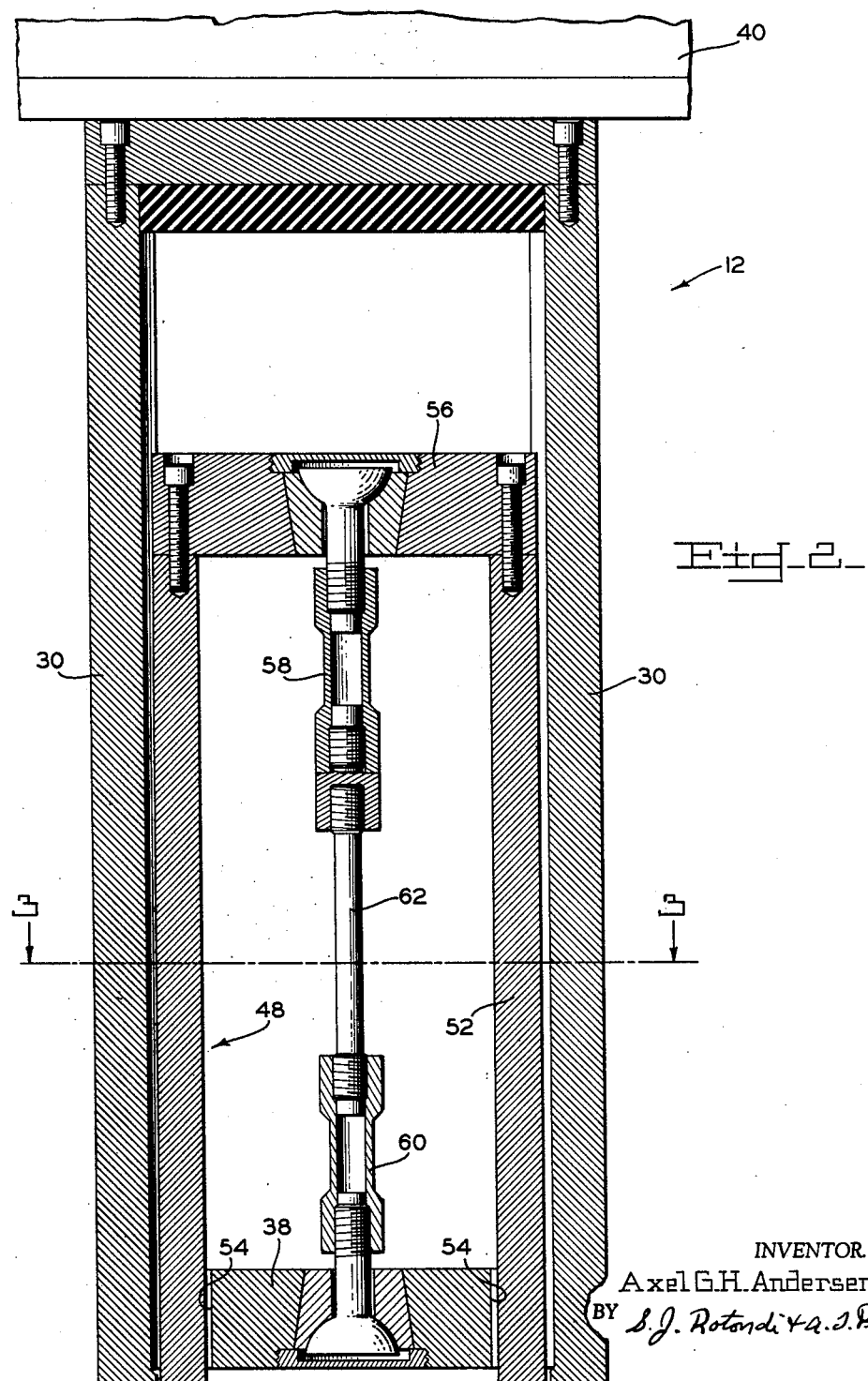

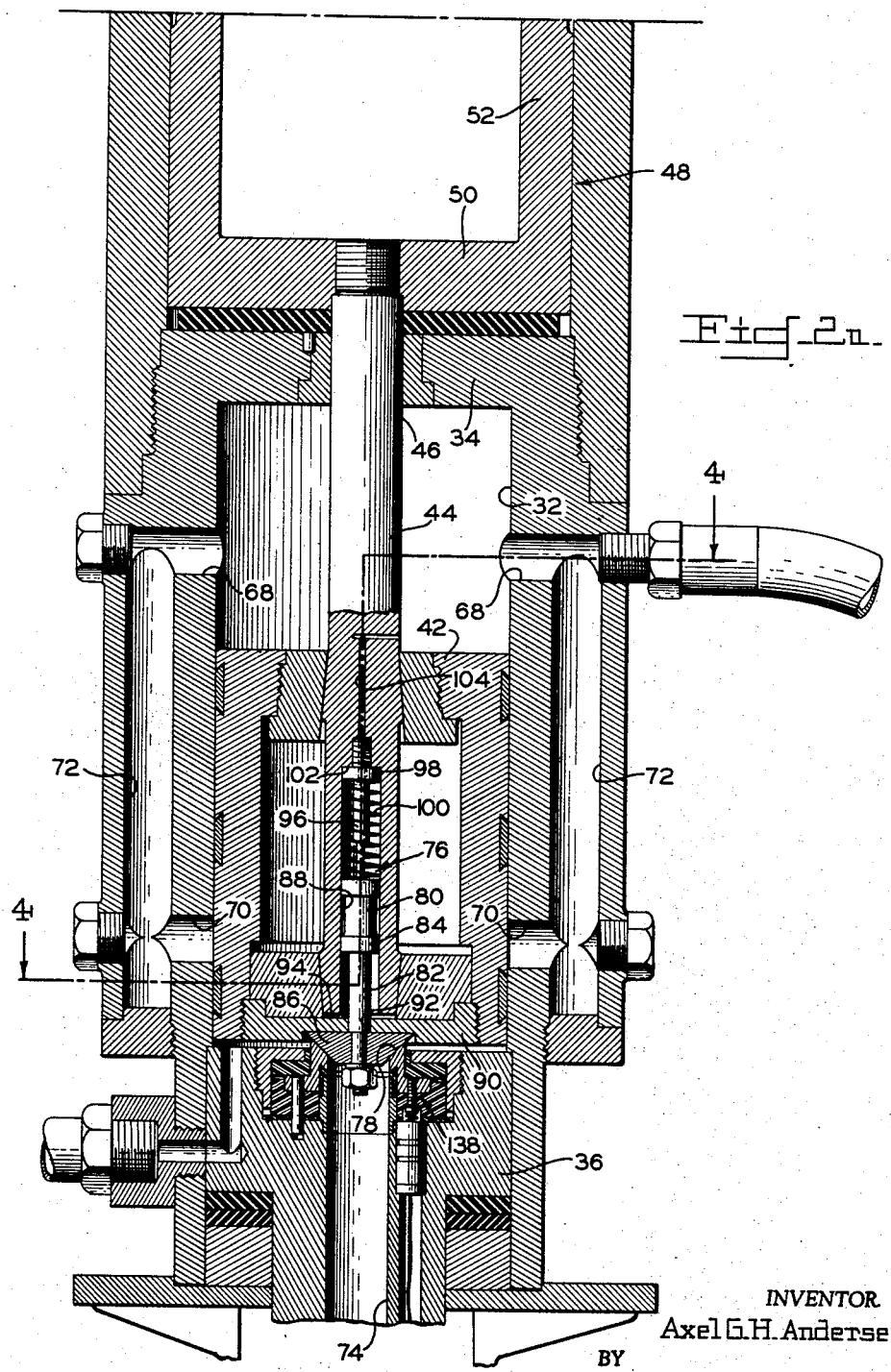

INVENTOR.
Axel G. H. Andersen
BY
S. J. Rotondi & A. J. Dupont

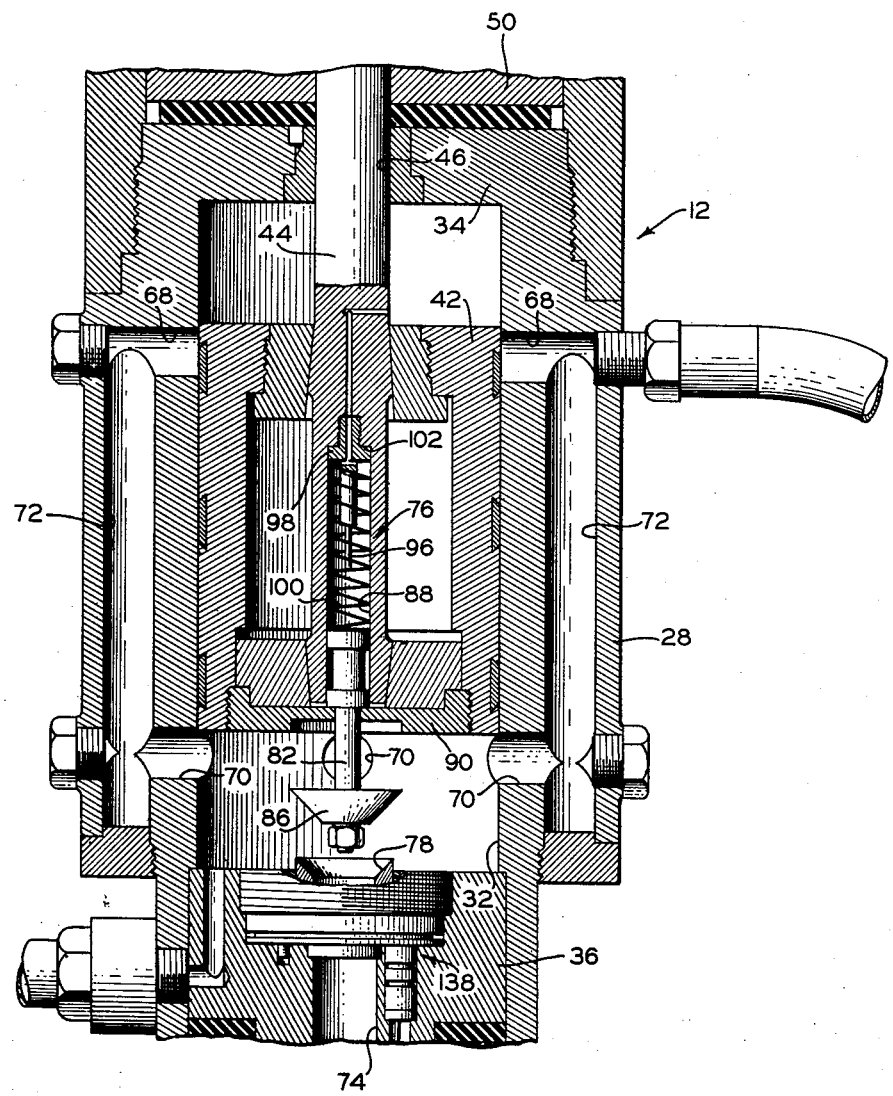

Aug. 4, 1964  A. G. H. ANDERSEN  3,142,980
FAST ACTING TENSILE TESTER
Filed July 2, 1962  7 Sheets-Sheet 6
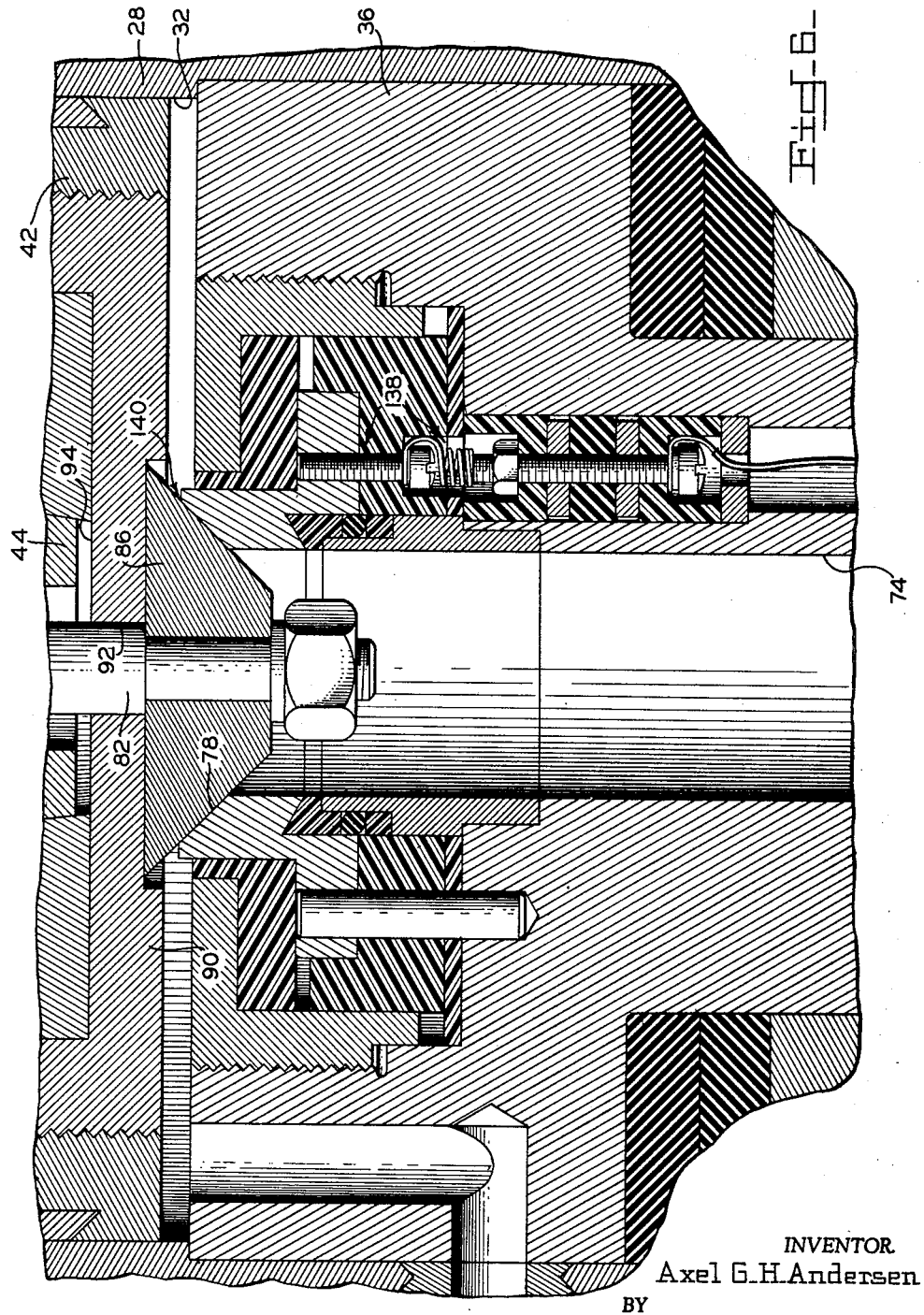
Fig-6-
INVENTOR.
Axel G. H. Andersen
BY
S. J. Rotondi & A. J. Dupont Aug. 4, 1964　　　A. G. H. ANDERSEN　　　3,142,980
FAST ACTING TENSILE TESTER
Filed July 2, 1962　　　　　　　　　　　　　7 Sheets-Sheet 7
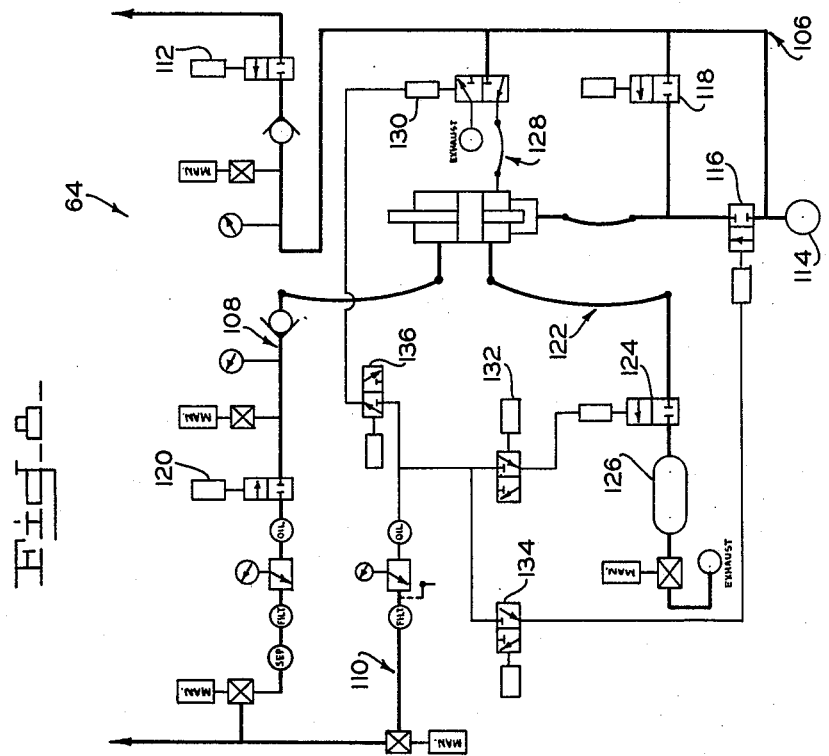
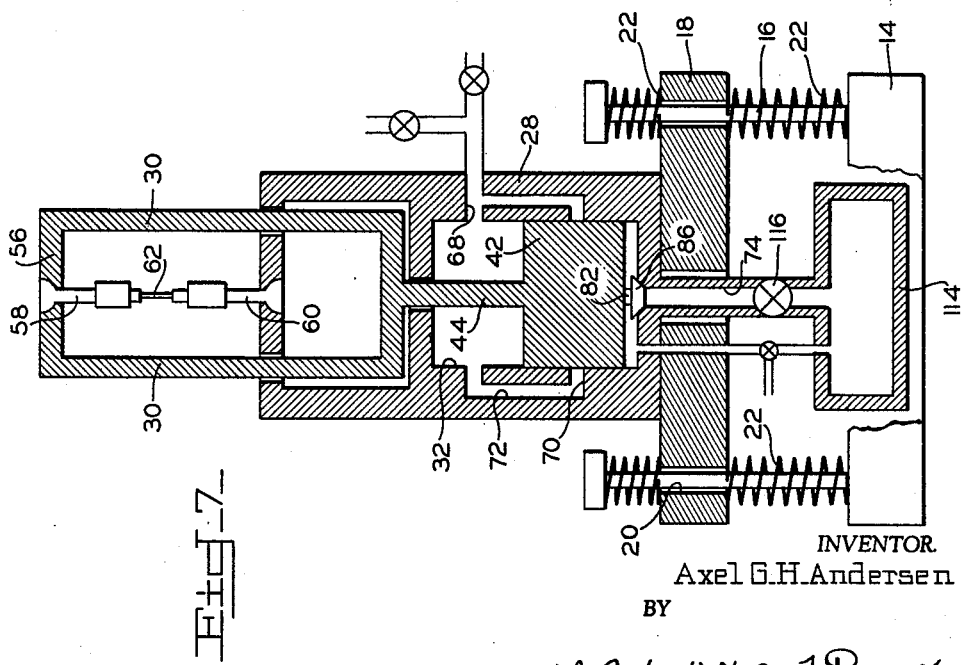
INVENTOR.
Axel G.H. Andersen
BY
S. J. Rotondi & A. J. Dupont

United States Patent Office 3,142,980
Patented Aug. 4, 1964

3,142,980
FAST ACTING TENSILE TESTER
Axel G. H. Andersen, Wayland, Mass., assignor to the United States of America as represented by the Secretary of the Army
Filed July 2, 1962, Ser. No. 207,132
6 Claims. (Cl. 73—97)
(Granted under Title 35, U.S. Code (1952), sec. 266)

The invention described herein may be manufactured and used by or for the Government for governmental purposes without the payment to me of any royalty thereon.

This invention relates to mechanical testing machines and more particularly to machines for testing dynamically the tensile characteristics of metals.

Dynamic testing of mechanical properties of materials began in the early years of this century and has in recent years become of increasing importance with the materials in new ordnance weapons and space vehicles being subject to sudden and fluctuating loads and very high stresses. With the advent of electric resistance strain gages and oscilloscopes in the materials testing field, the technique of high-speed testing has advanced rapidly.

Various means are used for driving the tensile testing machines. One is by a hydraulically or pneumatically driven piston, but here, as well as in other driving means, the devices are subject to terrific impact during cyclic operation and abrupt stoppage of moving masses; this produces vibrations in the machine disturbing to alignments and instruments and which serve to confuse the test recordings.

It is, therefore, an object of this invention to provide a tensile testing machine which will load a specimen at rates up to about 10 kilo pounds per millisecond and in which vibration disturbances are kept at a minimum.

It is another object of this invention to provide a fast-acting tensile testing machine which is powered by a pneumatically energized piston and in which the surplus energy of the moving components, subsequent to parting of a specimen, is absorbed by rapidly damped oscillations of the piston assembly between two air cushions.

It is a further object of this invention to provide such a tensile testing machine in which the severe effects of abrupt deceleration, occurring when a specimen remains unbroken after rapid loading, are made innocuous by the sturdy construction of the machine and its mounting.

It is a still further object of this invention to provide such a tensile testing machine which is simple in design and positive in operation.

The specific nature of the invention as well as other objects and advantages thereof will clearly appear from a description of a preferred embodiment as shown in the accompanying drawings in which:

FIG. 2 is a view of the upper portion of the tensile testing machine;

FIG. 2a is a view of the lower portion of the tensile testing machine;

FIG. 4 is a view taken along line 4—4 of FIG. 2a;

FIG. 5 is a longitudinally cross-sectioned view of the cylinder and piston group showing the valve assembly in the extended position;

FIG. 6 is an enlarged longitudinally cross-sectioned view of the top portion of the cylinder closing block showing the electrical switch arrangement therein;

FIG. 7 is a schematic view of the tensile testing machine; and

FIG. 8 is a functional, diagrammatic plan of the pneumatic controlling system.

Figure 1:
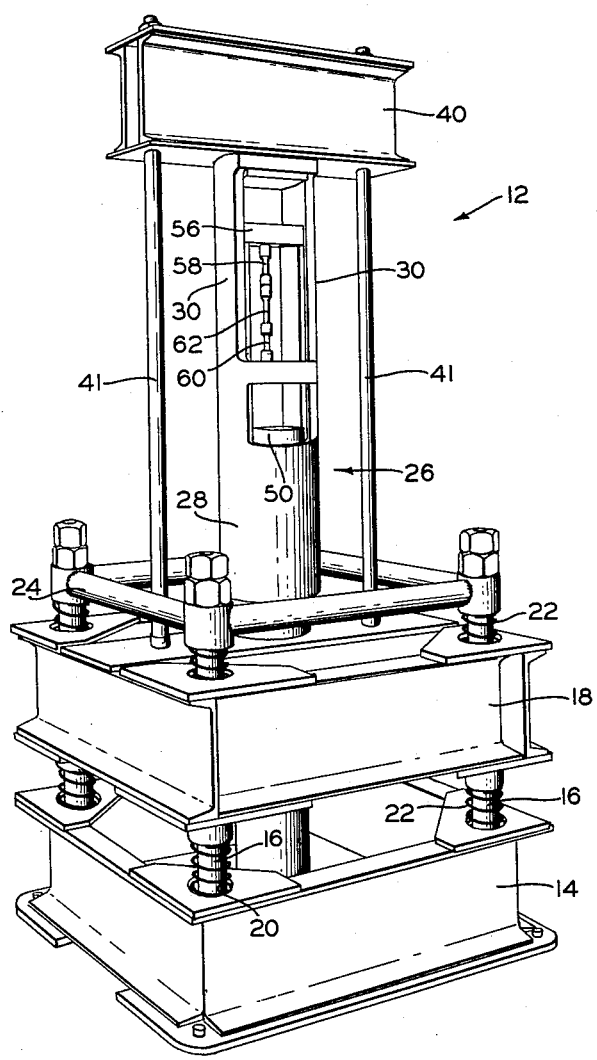
FIG. 1 is a reduced perspective view of the tensile testing machine.
Figure 3:
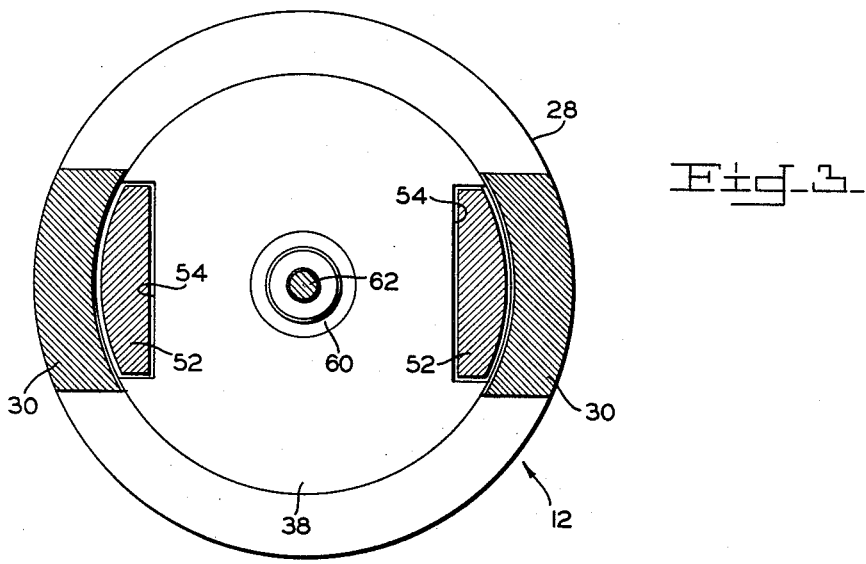
FIG. 3 is a view taken along line 3—3 of FIG. 2.
Figure 4:
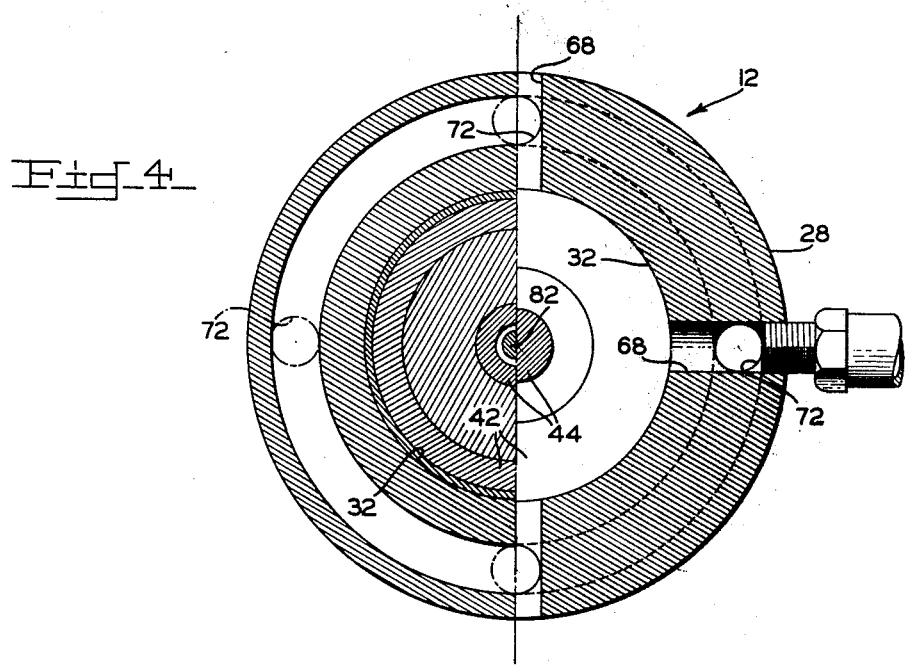

Shown in the figures is a rapid-acting tensile testing machine 12 having a rectangular frame base 14 with a post 16 extending upwardly from each of the corners thereof. Base 14 mounts a carriage 18 which is also of rectangular configuration and is provided with bores 20 for slidingly receiving posts 16 therethrough. A pair of compressible coil springs 22 is mounted on each of the posts 16 with one of each pair being disposed between carriage 18 and base 14 and the other disposed between the carriage and a rail 24 connecting the top ends of the posts. Thus, carriage 18 floats between the pairs of springs 22 to resiliently absorb any shock transferred to the carriage.

Carriage 18 mounts a stanchion 26 which includes a cylinder 28 formed in its lower part and a pair of diametrically opposed arms 30 extending integrally upward therefrom in parallel relationship. Cylinder 28 includes a power cavity 32 which extends upwardly thereinto to a wall 34 and is closed at the bottom end by a block 36 which supports stanchion 26 on carriage 18. A cylindrical lower platen 38 is integrally formed between arms 30 so as to be spaced above the top end of cylinder 28. A girder 40 is fixedly mounted across the top ends of arms 30 and is also fixedly secured to a pair of posts 41 fixed at the bottom ends to carriage 18.

A piston 42 is slidingly mounted in power cavity 32 and a shaft 44 extends coaxially through the piston and continues upwardly therefrom through a mating hole 46 in wall 34 to fixedly connect the piston to a yoke 48 which is slidingly disposed in stanchion 26 above the cylinder. Yoke 48 includes a circular table 50, which is mounted between the top end of cylinder 28 and lower platen 38, and a pair of supports 52 which extend upwardly from the table respectively contiguous to the arms 30. Supports 52 are slidingly received by slots 54 through lower platen 38 and fixedly mounted on the top ends of the supports is an upper platen 56. Thus, when piston 42 is impelled upwardly, as hereinafter described, the distance between upper platen 56 and lower platen 38 is increased.

Centrally mounted on the underside of upper platen 56 is a top load transducer 58 and a bottom load transducer 60 is centrally mounted on the top side of lower platen 38. Top load transducer 58 and bottom load transducer 60 are arranged to firmly grasp the opposite ends of a test specimen 62.

Piston 42 is energized to load specimen 62 by a pneumatic system 64 which is triggered to fire tensile testing machine 12 through electrically actuated solenoids. Pnuematic system 64 includes a system of ducts formed in the walls of cylinder 28 and such system includes four ports 68 having communication with power cavity 32 in the upper portion thereof, four orifices 70 which have communication with the power cavity in the bottom portion thereof, and passages 72 which interconnect all of the ports and orifices.

Extending axially through block 36 is a bore 74 which provides for the discharge of inert nitrogen gas, as hereinafter described, into power cavity 32. The discharge of the gas is controlled by a valve assembly 76 which is mounted in the lower end of shaft 44 and which has cooperation with a valve seat 78 located at the mouth of the top end of bore 74. Valve assembly 76 includes a piston 80 with polished sections 84 of larger diameter and a stem 82 which connects the piston to a concentric valve head 86. Piston 80 is slidingly received by a dead end bore 88 which has a diameter similar to that of sections 84. A plate 90 is fixed to the bottom end of piston 42 and such plate is provided with an aperture 92 which is concentric to bore 88 and which has a diameter similar to that section of stem 82 received thereby. The bottom one of the sections 84 is in contact with the top surface of plate 90 at 94 when valve assembly 76 is in an extended position relative to piston 42.

A guide rod 96 is fixedly mounted in the top end of bore 88 so as to extend downwardly thereinto. Guide rod 96 is provided with a head 98 of larger diameter adjacent the top end and a compressible coil spring 100 is mounted on the guide rod between the top end of piston 80 and the head to bias valve assembly 76 to the extended position. A duct 104 is provided in shaft 44 and continues into guide rod 96 to provide communication between power cavity 32 above piston 42 and bore 88 above piston 80 so that superior pressure in the power cavity above the piston, acting on upper face of the piston, will displace valve assembly 76 downwardly to the extended position.

Valve assembly 76, piston 42 and orifices 70 are so related that, when the valve assembly is in its extended position relative to the piston and valve head 86 is in contact with valve seat 78, the orifices are closed by the piston. Piston 42, ports 68 and orifices 70 are so related that, when the ports are uncovered by the piston, the orifices are closed and vice versa, and so that, when the piston is passing the ports or orifices, both thereof are partially unblocked. Also, ports 68 are positioned from wall 34 so that, when piston 42 is displaced upwardly in cylinder 28, sufficient gases are trapped above the piston in power cavity 32, after ports 68 are closed by the piston, to cushion the upward flight thereof. Orifices 70 are spaced from the bottom end of power cavity 32 so that sufficient gases are trapped, after piston 42 is displaced downwardly past the orifices, to cushion the downward displacement of the piston.

Pneumatic system 64 includes a high pressure piping assembly 106, a medium pressure piping assembly 108 and a low pressure piping assembly 110. High pressure piping assembly 106 is connected to the lower end of bore 74 and includes a solenoid actuated loading valve 112, an accumulator 114 for storing nitrogen gas at 1000 lbs. pressure, a high pressure diaphragm valve 116, a solenoid actuated relief valve 118 for quick pressure relief (when a short pulse is specified) and suitable gauges, hand actuated valve and check valves, as shown in FIG. 8, for charging the accumulator from a source (not shown) and selectively controlling the delivery of the stored high pressure nitrogen to the bore for driving piston 42 upwardly in cylinder 28 when valve head 86 is unseated from valve seat 78.

Medium pressure piping assembly 108 delivers air from a 100 lb. pressure source (not shown) to passages 72 for producing a counterpressure on the head of piston 42 and includes a solenoid actuated loading valve 120 and suitable air pressure regulator, filtering, gauging and checking means as shown in FIG. 8.

Low pressure piping assembly 110 is connected to the source of air pressure (not shown) and is arranged to provide air at 35 lbs. pressure to the diaphragm actuated valves for operation thereof as hereinafter described.

Pneumatic system 64 also includes an exhaust system 122 controlled by a diaphragm valve 124 and connected to passages 72 for exhausting gases from power cavity 32 to a surge tank 126. Another exhaust system 128 exhausts gases, under the control of a diaphragm valve 130, from the bottom of power cavity 32 to the atmosphere in the event of leakage of high pressure nitrogen past valve head 86. A solenoid actuated valve 132 in low pressure piping assembly 110 controls the application of air pressure to diaphragm valve 124, and solenoid actuated valves 134 and 136, respectively, control the application of air pressure to diaphragm valves 116 and 130.

Valves 132, 134 and 136 are three-way valves, in order to normally vent the chambers of the associated diaphragm valves 124, 116 and 130, thereby preventing any premature action thereof. Diaphragm valve 130 is also a three-way valve which, when closed, ventilates power cavity 32 under piston 42 to atmosphere. Loading valves 112 and 120 are two-way valves as are also relief valve 118 and diaphragm valves 116 and 124.

Load, strain and crosshead travel data can be photographically recorded on an oscilloscope (not shown), triggered through an electrical circuit 138 by means of a switch device 140. This is effected by electrically insulating valve seat 78 and circuit 138 from the rest of tensile testing machine 12 so that, when valve head 86 is in contact with the valve seat, an electrical circuit is completed between circuit 138 and the tensile testing machine and, when the valve head is unseated, the electrical circuit is broken.

To operate tensile testing machine 12, specimen 62 is gripped between top load transducer 58 and bottom load transducer 60. Next, loading valve 120 is actuated to open communication between the source of air pressure (not shown) and power cavity 32 above piston 42. This presses piston 42 against valve head 86 so that the valve head is firmly held on valve seat 78 to close communication between bore 74 and power cavity 32. Loading valve 112 and valve 116 are then actuated to permit the flow of high pressure nitrogen gas from accumulator 114 through high pressure piping assembly 106 into bore 74 under valve head 86.

As long as the total pressure on top of piston 42, plus the force exerted between upper platen 56 and lower platen 38, exceed the force on the top of valve head 86 due to pressure on its under surface, the piston and yoke 48 will remain stationary.

Tensile testing machine 12 is fired by actuating diaphragm valve 124 which quickly exhausts the air in power cavity 32 above piston 42. Thus, with the force holding piston 42 down and valve head 86 seated released, the pressure of the nitrogen gas, acting against the face of valve head 86 exposed thereto in bore 74, will cause the valve head to be unseated and the piston to be displaced upwardly thereby. This permits high pressure nitrogen gases to enter power cavity 32 under piston 42 from accumulator 114 with the working area subjectable to the pressure being increased from a portion of valve head 86 to the combined areas of the valve head and the bottom surface of piston 42. Thus, piston 42 and valve assembly 76 are driven up rapidly as a unit with the pressure applied thereto being transferred to specimen 62 through yoke 48. Specimen 62 is loaded to capacity in one to two milliseconds. If and when specimen 62 ruptures, piston 42 is freed to be impelled upwardly by the force applied by the nitrogen gas plus accumulated inertial forces.

After the top and bottom ends of piston 42 reach the lower edges of ports 68 and orifices 70, respectively, and move toward the upper edges thereof, communication is provided between accumulator 114 and surge tank 126 so that their pressures tend to equalize with the high pressure nitrogen gas below the piston routed out of orifices 70 through passages 72 and from ports 68 above the piston. When piston 42 moves past ports 68, the nitrogen gas above the piston is entrapped in the upper portion of power cavity 32. The entrapped nitrogen gas acts as a cushion to absorb the energy in piston 42 and to reverse the direction of movement thereof.

The compressed nitrogen gas entrapped above piston 42 reaches a higher pressure than that below the piston and this superior pressure impinges on the top of valve assembly 76 through duct 104 and aids spring 100 in overcoming the G force between the valve assembly and piston 42 thereby causing the valve assembly to be displaced to the extended position and valve head 86 to be moved downwardly ahead of the piston. As has been stated hereinbefore, the extended position of valve head 86, relative to piston 42 and orifices 70, is arranged so that, when the valve head contacts valve seat 78, the lower face of the piston is positioned past the orifices. The gas thus entrapped beneath piston 42 keeps valve head 86 firmly seated on valve seat 78 and acts to form a cushion which absorbs more of the energy in piston 42 and yoke 48 and reverses the direction of movement thereof to complete the first cycle. The second cycle commences without active pressure in accumulator 114 and it is followed by other cycles until the energy of the system is reduced to zero.

Because of the high pressures used in high pressure piping assembly 106 and the possibility of wear, leakages might occur past valve head 86 sufficient to cause premature action of piston 42. To prevent this, diaphragm valve 130 normally vents the area under piston 42 to the atmosphere through exhaust system 128 but at the instant of firing this vent is shut off as the valve opens and high pressure nitrogen gas is sent through exhaust system 128 in reverse to act against the underside of piston 42. This gas pressure assists in initiating upward displacement of piston 42 to release valve head 86.

From the foregoing it is clearly apparent that there is provided herein a high-speed tensile testing machine which rapidly loads a test specimen to capacity and in which vibrations caused by cyclic action of the piston and yoke are brought to a minimum, with the testing machine being simple in design, rugged in construction and positive in operation.

Although a particular embodiment of the invention has been described in detail herein, it is evident that many variations may be devised within the spirit and scope thereof and the following claims are intended to included such variations.

I claim:

1. A tensile testing machine including a stanchion provided with a cylinder having a power cavity and a pair of arms extending vertically upward from said cylinder, a block for closing the bottom end of said cavity, a wall closing the top end of said cavity, a shaft extending through a mating hole in said wall, a piston fixedly mounted on the lower end of said shaft in said cavity for vertical reciprocation therein, a yoke mounted for vertical displacement in said stanchion between said arms so as to be slidingly supported thereby, said yoke being connected to said shaft for reciproctaion by said piston, a bore extending through said block into communication with said cavity, a valve seat located at the mouth of said bore in said cavity, a valve assembly mounted in the lower section of said shaft for displacement within said piston into contact with said valve seat to block communication between said bore and said cavity, a lower platen integrally formed between said arms, an upper platen carried by said yoke, a pair of work transducers respectively mounted on said lower platen and said upper platen for securely gripping a specimen therebetween, a pneumatic system including a high pressure piping system for delivering high pressure gas to said bore to energize said piston for rupturing the specimen when said valve assembly is unseated from said valve seat, means in said pneumatic system for initially displacing said piston to unseat said valve assembly, and means for damping the surplus energy in said piston and yoke by oscillation thereof between two air cushions respectively formed in said cavity above and below said piston.

2. The tensile testing machine as defined in claim 1 wherein said pneumatic system is arranged in cooperation with said damping means to form the two air cushions.

3. The tensile testing machine as defined in claim 1 wherein said valve assembly is arranged for sliding displacement in said shaft to an extended position relative to said piston and wherein said damping means includes in cooperation with said valve assembly a plurality of ports formed in said cylinder at the upper portion of said cavity for communication therewith, a plurality of orifices formed in said cylinder at the lower portion of said cavity for communication therewith, and a plurality of passages arranged in said cylinder for interconnecting said ports and orifices, said orifices being located so as to be closed by said piston when said valve assembly in the extended position contacts said valve seat to trap sufficient gas in said cavity below said piston to form one of the air cushions, said ports being located so that when covered by said piston the other one of the two air cushions is formed by the gas trapped above said piston, and said ports, orifices and piston are so interrelated that said ports and orifices are partially uncovered by said piston when passing thereby to provide intercommunication between said ports and orifices through said passages.

4. The tensile testing machine as defined in claim 3 wherein said valve seat is electrically insulated from said valve assembly to cooperate therewith in forming an electrical switch.

5. The tensile testing machine as defined in claim 3 wherein said pneumatic system includes means for delivering air under less pressure than the high pressure gas to said passages so as to provide sufficient pressure against the top of said piston to hold said valve assembly seated on said valve seat against the force of the high pressure gas in said bore.

6. The tensile testing machine as defined in claim 5 and including means for quickly exhausting the air from above said piston so that said valve assembly is unseated and said piston is rapidly energized by the released high pressure gas to load the specimen.

References Cited in the file of this patent

UNITED STATES PATENTS

| | | |
|---|---|---|
| 1,442,646 | Butler | Jan. 16, 1923 |
| 2,576,433 | Wood | Nov. 27, 1951 |
| 2,809,722 | Smith | Oct. 15, 1957 |
| 2,931,218 | Ottestad | Apr. 5, 1960 |
| 3,039,439 | Murek | June 19, 1962 |
| 3,057,190 | Minke | Oct. 9, 1962 |

FOREIGN PATENTS

| | | |
|---|---|---|
| 696,803 | Germany | Sept. 30, 1940 |